(12) United States Patent
Sengoku et al.

(10) Patent No.: US 8,380,428 B2
(45) Date of Patent: Feb. 19, 2013

(54) NAVIGATION SERVER

(75) Inventors: Koji Sengoku, Tokyo (JP); Aiko Sugawara, Tokyo (JP); Tadafumi Nogawa, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/428,697

(22) Filed: Mar. 23, 2012

(65) Prior Publication Data

US 2012/0185169 A1 Jul. 19, 2012

Related U.S. Application Data

(62) Division of application No. 13/060,042, filed as application No. PCT/JP2009/003035 on Jun. 30, 2009.

(30) Foreign Application Priority Data

| Aug. 25, 2008 | (JP) | ................................ 2008-215824 |
| Aug. 28, 2008 | (JP) | ................................ 2008-220543 |
| Aug. 28, 2008 | (JP) | ................................ 2008-220545 |

(51) Int. Cl.
*G01C 21/00* (2006.01)

(52) U.S. Cl. ...................................... 701/410

(58) Field of Classification Search .................. 710/400, 710/410, 420, 451, 484, 511
See application file for complete search history.

(56) References Cited

U.S. PATENT DOCUMENTS

| 2005/0015186 A1* | 1/2005 | Kelly et al. ...................... 701/29 |
| 2006/0206248 A1* | 9/2006 | Noussias et al. ................. 701/29 |
| 2007/0021909 A1* | 1/2007 | Matsuda ....................... 701/208 |

FOREIGN PATENT DOCUMENTS

| JP | 2001-188985 | 7/2001 |
| JP | 2005-163584 | 6/2005 |
| JP | 2006-23176 | 1/2006 |
| JP | 2006-30058 | 2/2006 |
| JP | 2006-58085 | 3/2006 |
| JP | 2007-248185 | 9/2007 |
| JP | 2007-269210 | 10/2007 |
| JP | 2008-32542 | 2/2008 |
| JP | 2008-45992 | 2/2008 |
| JP | 2008-89438 | 4/2008 |

OTHER PUBLICATIONS

International Search Report for Application No. PCT/JP2009/003035, pp. 1-4, dated Oct. 13, 2009.

* cited by examiner

*Primary Examiner* — Kim T Nguyen
(74) *Attorney, Agent, or Firm* — Nelson Mullins Riley & Scarborough LLP; Anthony A. Laurentano

(57) ABSTRACT

According to a navigation server (1) of the present invention, in a mileage matrix containing elements which denote a mileage and are defined by respective mileage factors, a first element of the elements in the mileage matrix which is defined by recognized mileage factors is determined on the basis of the mileage of the recognized mileage of a first vehicle. A second element of the elements in the mileage matrix which is defined by unrecognized mileage factors is determined on the basis of the first element. According thereto, even when the mileage factors of a second vehicle are used to define the second element but not the first element, the previous mileage of the second vehicle can be evaluated with high accuracy in consideration of a relationship between the mileage and the mileage factors of the first vehicle estimated according to the known relationship therebetween.

2 Claims, 9 Drawing Sheets

FIG.3

|   | 1 | 2 | ....... | j | ....... | m | ← SECOND MILEAGE FACTOR |
|---|---|---|---------|---|---------|---|---|
| 1 | $F_{11}$ | $F_{12}$ | ....... | $F_{1j}$ | ....... | $F_{1m}$ | |
| 2 | $F_{21}$ |  | ....... | $F_{2j}$ | ....... | $F_{2m}$ | |
| . | . | . | . | . | . | . | |
| . | . | . | . | . | . | . | |
| i | $F_{i1}$ | $F_{i2}$ | ....... | $F_{ij}$ | ....... | $F_{im}$ | |
| . | . | . | . | . | . | . | |
| . | . | . | . | . | . | . | |
| n | $F_{n1}$ | $F_{n2}$ | ....... | $F_{nj}$ | ....... | $F_{nm}$ | |

↑ FIRST MILEAGE FACTOR

NAVIGATION SERVER

PRIORITY CLAIM

The present application is a Divisional application of U.S. patent application Ser. No. 13/060,042 filed Feb. 21, 2011, which is based on and claims the priority benefit of International Patent Application No. PCT/JP2009/003035 filed on Jun. 30, 2009, Japanese Patent Applications 2008-215824 filed on Aug. 25, 2008, 2008-220543 filed on Aug. 28, 2008 and 2008-220545 filed on Aug. 28, 2008, the contents of which are incorporated herein by reference in its entirety.

BACKGROUND OF THE INVENTION

1. Field of the Invention

The present invention relates to a navigation server managing mileage information.

2. Description of the Related Art

There have been disclosed various kinds of techniques for improving mileage of a vehicle (refer to Japanese Patent Laid-open No. 2007-248185, 2008-032542, 2007-269210 and 2006-023176). For example, on the basis of a present position and a scheduled travel route of the vehicle, an operation position of a gear and the rotation numbers of the engine at which the mileage is optimum are reported to the driver. The velocity pattern and the consumed fuel amount of the vehicle related to a search route are also reported to the driver.

Further, there has been disclosed a technique configured to search a travel route with a low mileage in a server and transmit information of the searched travel route to a vehicle (refer to Japanese Patent Laid-open No. 2005-163584, 2006-058085 and 2006-030058). Specifically, position information, mileage information and the like of a vehicle are collected by the server, and thereafter, a database of the mileage information related to vehicle types and travel conditions such as road types and the like is generated. Then, a travel route with a low mileage is searched on the basis of the mileage information managed by the database and the information of the travel route with a low mileage is provided from the server to a vehicular control apparatus.

Furthermore, there has been disclosed a technique for guiding a vehicle to depart from the present position at a time which is determined by the arrival to a destination position at a given time (refer to Japanese Patent Laid-open No. 2008-089438).

However, when the mileage information related to a part of vehicle types, travel conditions and the like is deficient in the database, the mileage information determined by mileage factors for defining the mileage which is related to the deficient vehicle types, the travel condition and the like can not be provided to the vehicle.

SUMMARY OF THE INVENTION

The present invention has been accomplished in view of the aforementioned problems, and it is therefore an object of the present invention to provide a navigation server capable of providing appropriate information to a user of a vehicle from the viewpoint of improving mileage.

Particularly, the present invention provides a navigation server capable of providing mileage related information related to mileage factors to the user of a vehicle even though the mileage of the vehicle related to the mileage factors identical to another vehicle is not recognized. It is further an object of the present invention to provide a navigation server capable of providing an appropriate departure time slot to the user of a vehicle from the viewpoint of improving mileage of the vehicle.

To attain an object described above, a first aspect of the present invention is to provide a navigation server which manages mileage information of a vehicle. The navigation server of the present invention comprises: a first support calculating element configured to recognize a mileage and a plurality of mileage factors serving as mileage variation factors of a first vehicle according to communication with a first information processing terminal, and to generate a mileage matrix containing elements which denote a mileage and are defined by the mileage factors by determining a first element of the elements in the mileage matrix which is defined by a recognized mileage factor on the basis of the mileage and a second element of the elements in the mileage matrix which is defined by an unrecognized mileage factor on the basis of the first element, and a second support calculating element configured to recognize a mileage factor of a second vehicle in a previous time according to communication with a second information processing terminal, to search an element defined by the recognized mileage factor as a previous mileage on the basis of the mileage matrix generated by the first support calculating element, and to transmit mileage related information determined on the basis of the previous mileage to the second information processing terminal.

According to the navigation server of the first aspect of the present invention, among the elements in the mileage matrix in which each element denoting the mileage is defined by the plural mileage factors, the first element which is defined by a recognized mileage factor of the first vehicle is determined on the basis of the recognized mileage of the first vehicle. According thereto, when the mileage factors of a second vehicle in the previous time are used to define the first element, the previous mileage of the second vehicle can be evaluated with high accuracy on the basis of the known relationship between the mileage and the mileage factors of the first vehicle.

On the other hand, the second element of the elements in the mileage matrix which is defined by an unrecognized mileage factor is determined on the basis of the first element. According thereto, even when the mileage factors of the second vehicle in the previous time are used to define the second element but not the first element, the previous mileage of the second vehicle can be evaluated with high accuracy in consideration of an estimated relationship between the mileage and the mileage factors of the first vehicle estimated on the basis of the known relationship therebetween.

Thereby, even though the mileage related to the mileage factors of the second vehicle is not recognized, the mileage related information of the mileage defined on the basis of the plurality of mileage factors thereof can be provided to the user of the second vehicle.

Note that a component of the present invention "recognizes" information" means that the component performs necessary arithmetic processing on a piece of information to prepare the piece of information ready for other information processing, for example, the component receives the piece of information from an external information source; searches the piece of information in a database or retrieves the piece of information from a storing device or a memory; measures, calculates, estimates, configures, determines, or searches the piece of information via arithmetic processing on the basis of the received or retrieved basic information or the like; and stores the processed information in the storing device or the memory.

In the navigation server of the first aspect of the present invention, it is acceptable that the second support calculating element is configured to transmit information determined on the basis of either one or both of a negative mileage factor which is used as the mileage factor to define the element in the mileage matrix searched as the previous mileage less than a predefined value and a positive mileage factor which is used as the mileage factor to define the element in the mileage matrix searched as the previous mileage equal to or greater than the predefined value as the mileage related information to the second information processing terminal.

According to the navigation server of the above-mentioned configuration, when the mileage of the second vehicle in the previous time was bad that it was less than the predefined value, the negative mileage factor causing the mileage to become bad can be recognized by the user of the second vehicle through the mileage related information. On the other hand, in addition to or in place of the negative mileage factor, when the mileage of the second vehicle in the previous time was good that it was equal to or greater than the predefined value, the positive mileage factor causing the mileage to become good can be recognized by the user of the second vehicle through the mileage related information. Therefore, even though the mileage of the first vehicle related to the mileage factor of the second vehicle in the previous time is not recognized, the information denoting the affecting factors of the previous mileage of the second vehicle can be provided to the user of the second vehicle.

In the navigation server of a second aspect of the present invention, it is acceptable that the second support calculating element is configured to transmit advice information for improving the mileage in consideration of either one or both of the negative mileage factor and the positive mileage factor as the mileage related information to the second information processing terminal.

According to the navigation server of the above-mentioned configuration, even though the mileage of the first vehicle related to the mileage factor of the second vehicle in the previous time is not recognized, the advice information for improving the mileage can be provided to the user of the second vehicle in consideration of the affecting factors of the previous mileage of the second vehicle.

To attain an object described above, a second aspect of the present invention is to provide a navigation server which manages mileage information of a vehicle. The navigation server of the present invention comprises: a first support calculating element configured to recognize a mileage and a plurality of mileage factors serving as mileage variation factors of a first vehicle according to communication with a first information processing terminal, and to generate a mileage matrix containing elements which denote a mileage and are defined by the mileage factors by determining a first element of the elements in the mileage matrix which is defined by a recognized mileage factor on the basis of the mileage and a second element of the elements in the mileage matrix which is defined by an unrecognized mileage factor on the basis of the first element, and a second support calculating element configured to recognize a mileage factor of a second vehicle in a future time according to communication with a second information processing terminal, to search an element defined by the recognized mileage factor as a predicted mileage on the basis of the mileage matrix generated by the first support calculating element, and to transmit mileage related information determined on the basis of the predicted mileage to the second information processing terminal.

According to the navigation server of the second aspect of the present invention, among the elements in the mileage matrix in which each element denoting the mileage is defined by the plural mileage factors, the first element which is defined by a recognized mileage factor of the first vehicle is determined on the basis of the recognized mileage of the first vehicle. According thereto, when the predicted mileage factors of the second vehicle in the future time are used to define the first element, the future mileage of the second vehicle can be evaluated with high accuracy on the basis of the known relationship between the mileage and the mileage factors of the first vehicle.

On the other hand, the second element of the elements in the mileage matrix which is defined by the unrecognized mileage factor is determined on the basis of the first element. According thereto, even when the mileage factors of the second vehicle in the future time are used to define the second element but not the first element, the future mileage of the second vehicle can be predicted with high accuracy in consideration of an estimated relationship between the mileage and the mileage factors of the first vehicle estimated according to the known relationship therebetween.

Thereby, even though the mileage related to the mileage factors of the second vehicle is not recognized, the mileage related information in relation to the mileage defined according to the plurality of mileage factors thereof can be provided to the user of the second vehicle.

In the navigation server of the second aspect of the present invention, it is acceptable that the second support calculating element is configured to recognize a link constituting each of a plurality of routes joining a present position or departure position of the second vehicle and a destination position thereof according to communication with the second information processing terminal as the mileage factor, to search a route with the best mileage from the plurality of routes as an eco-route, and to transmit the mileage related information denoting the eco-route to the second information processing terminal.

According to the navigation server of the above-mentioned configuration, even though the mileage related to the links (mileage factors) constituting a route joining the present position or the departure position of the second vehicle and the destination position thereof is not recognized, the eco-route with the best predicted mileage can be searched for the second vehicle, and the mileage related information to the eco-route can be provided to the user of the second vehicle.

To attain an object described above, a third aspect of the present invention is to provide a navigation server which manages mileage information of a vehicle. The navigation server of the present invention comprises: a support database configured to store a mileage matrix containing elements which denote a mileage and are defined by a plurality of mileage factors which include a link and a time slot serving as mileage variation factors of the vehicle, a first support calculating element configured to recognize a plurality of routes joining a departure position of the vehicle and a destination position thereof according to communication with an information processing terminal, and a second support calculating element configured to calculate a sum of a plurality of elements in the mileage matrix defined by a plurality of the links constituting the plurality of routes recognized by the first support calculating element for a plurality of departure time slots, respectively, as a total predicted mileage, and to transmit mileage information related to the total predicted mileage for the plurality of departure time slots to the information processing terminal.

According to the navigation server of the third aspect of the present invention, for each of the plural departure time slots, the mileage from the departure position to the destination position along the route can be predicted appropriately on the basis of the mileage matrix in consideration of the fact that the mileage varies according to the link where the vehicle is traveling and according to the time slot where the vehicle is traveling in the link.

Thereafter, the mileage information related to the total predicted mileage for each of the plural departure time slots is transmitted to the information processing terminal. According thereto, the appropriate departure time slot can be recognized by the user of the vehicle from the viewpoint of improving the mileage for the vehicle to travel from the present position or the departure position to the destination position.

In the navigation server of the third aspect of the present invention, it is acceptable that the support database is further configured to store support map information denoting the arrangement of the links, the first support calculating element is configured to first recognize the departure position of the vehicle and the destination position thereof according to communication with the information processing terminal, and thereafter, to recognize a support route as one of the plurality of routes on the basis of the support map information, and the second support calculating element is configured to calculate the total predicted mileage for a combination of the support route recognized by the first support calculating element and each of the departure time slots, and to transmit the mileage information related to the total predicted mileage for the combination of the support route and each of the departure time slots to the information processing terminal.

According to the navigation server of the above-mentioned configuration, the appropriate support route and the appropriate departure time slot can be recognized by the user of the vehicle from the viewpoint of improving the mileage for the vehicle to travel from the departure position to the destination position along the support route.

In the navigation server of the third aspect of the present invention, it is acceptable that the first support calculating element is configured to recognize a scheduled departure time or a scheduled departure time slot of the vehicle, the second support calculating element is configured to calculate the total plural elements by using a reference departure time slot which contains therein the scheduled departure time or serves as the scheduled departure time slot, and one or a plurality of time slots before or after the reference departure time slot or one or a plurality of time slots before and after the reference departure time slot as the plurality of departure time slots.

According to the navigation server of the above-mentioned configuration, whether or not it is appropriate to depart in a time slot containing the scheduled departure time or it is appropriate to depart in a time slot before or after the reference departure time slot can be recognized by the user of the vehicle from the viewpoint of improving the mileage for traveling to the destination position.

In the navigation server of the third aspect of the present invention, it is acceptable that the second support calculating element is configured to calculate the total predicted mileage for a combination of the support route and each of the departure time slots with a time interval from the scheduled departure time equal to or less than a predefined interval, and to transmit the mileage information related to the total predicted mileage for the combination of the support route and each of the departure time slots to the information processing terminal.

According to the navigation server of the above-mentioned configuration, an appropriate route from the viewpoint of improving the mileage for the vehicle to travel from the departure position to the destination position and a departure time which is appropriate and not excessively deviated in time from the scheduled departure time slot from the same viewpoint can be recognized by the user of the vehicle.

In the navigation server of the third aspect of the present invention, it is acceptable that the support database is further configured to store road traffic information denoting a predicted travel time of the vehicle for each link in different time slots, and the first support calculating element is configured to determine, for a first link to a nth link which are joined sequentially to constitute the route on the basis of the road traffic information, a predicted travel time $t_2$ ($T_2$) in a second time slot $T_2$ which is determined as a predicted travel time slot for a second link on the basis of a sum obtained by adding a predicted travel time $t_1$ ($T_1$) for the first link in a first time slot $T_1$ serving as the departure time slot to a time in the first time slot $T_1$ and a predicted travel time $t_{i+1}$ ($T_{i+1}$) in an (i+1)th time slot $T_{i+1}$ which is determined as a predicted travel time slot for an (i+1)th link on the basis of a sum obtained by adding a predicted travel time $t_i$ ($T_i$) for an ith link in an ith time slot $T_i$ to a time in the ith time slot $T_i$ (i=2, 3 ... n−1).

According to the navigation server of the above-mentioned configuration, in consideration of the fact that the further a link serving as one of the mileage factors for defining each element is from the departure position of the vehicle, the later the predicted time slot for the vehicle to travel through the link will become, the elements in the mileage matrix serving as the summing subject for one departure time slot can be selected appropriately.

According thereto, the mileage for the vehicle to travel along the support route at each different departure time slot can be predicted with high accuracy. Thereby, the appropriate departure time slot can be recognized by the user of the vehicle from the viewpoint of improving the mileage for the vehicle to travel from the present position or the departure position to the destination position.

In the navigation server of the third aspect of the present invention, it is acceptable that the second support calculating element is configured to transmit information denoting an eco-departure time slot with the best total predicted mileage as the mileage information to the information processing terminal.

According to the navigation server of the above-mentioned configuration, the optimum departure time slot can be recognized by the user of the vehicle as the eco-departure time slot from the viewpoint of improving the mileage for the vehicle to travel from the present position or the departure position to the destination position.

In the navigation server of the third aspect of the present invention, it is acceptable that the second support calculating element is configured to transmit information denoting a combination of an eco-route and the eco-departure time slot which is a combination of the support route with the best total predicted mileage and the departure time slot as the mileage information to the information processing terminal.

According to the navigation server of the above-mentioned configuration, the optimum support route and the optimum departure time slot can be recognized by the user of the vehicle as the eco-route and the eco-departure time slot, respectively, from the viewpoint of improving the mileage for the vehicle to travel from the departure position to the destination position along the support route.

In the navigation server of the third aspect of the present invention, it is acceptable that the first support calculating element is configured to recognize a mileage of the vehicle and the plurality of mileage factors according to communication with the information processing terminal, and to generate the mileage matrix by determining a first element of the elements in the mileage matrix which is defined by a recognized mileage factor on the basis of the mileage and a second element of the elements in the mileage matrix which is defined by an unrecognized mileage factor on the basis of the first element.

According to the navigation server of the above-mentioned configuration, even when the mileage factor of the vehicle is used to define the second element but not the first element, the mileage of the vehicle can be evaluated with high accuracy according to the relationship between the mileage factor and the mileage estimated on the basis of the known relationship between the mileage and the mileage factor of another vehicle. Thereby, the optimum departure time slot can be recognized by the user of the vehicle as the eco-departure time slot from the viewpoint of improving the mileage for the vehicle to travel from the departure position to the destination position.

BRIEF DESCRIPTION OF THE DRAWINGS

FIG. 3 is an explanatory diagram related to a mileage matrix.

DETAILED DESCRIPTION OF THE PREFERRED EMBODIMENTS

First Embodiment

Hereinafter, an embodiment of a navigation server according to the present invention will be described with reference to the drawings.

(Configuration of the Navigation Server of the Present Invention)

Figure 1:
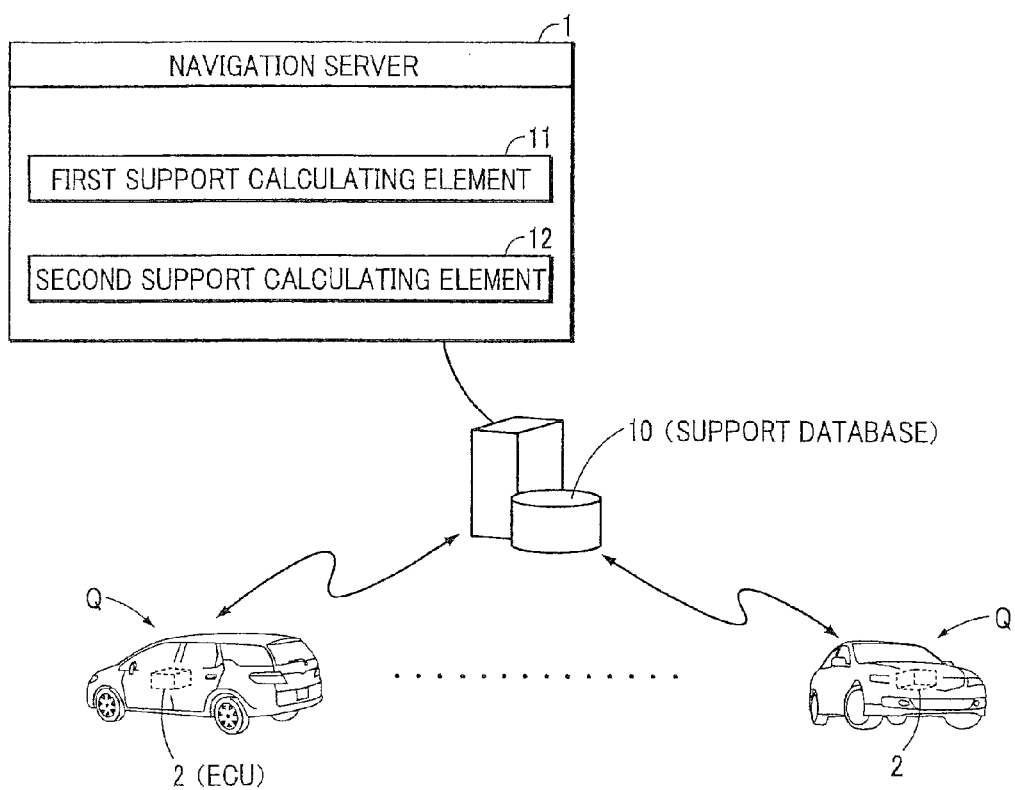
FIG. 1 is a configuration diagram of a navigation server of the present invention.

Firstly, the configuration of the navigation server of the present invention will be explained. The navigation server 1 illustrated in FIG. 1 is composed of one or a plurality of computers (including a CPU, a ROM, a RAM, an I/O circuit and the like) capable of communicating with a plurality of information processing terminals via a network.

In addition to an ECU (Electronic control unit) 2 mounted on each vehicle (four-wheeled automobile) Q, a computer having communication function, a cell phone or the like is equivalent to the information processing terminal. The information processing terminal such as the computer, the cell phone or the like may be ported by a user to use in the inner compartment of the vehicle Q via wireless connection or cable connection to the ECU 2 of the vehicle Q or may be used outside the vehicle Q such as in the user's house. It is acceptable that the vehicle Q is equivalent to either a first vehicle or a second vehicle or both of them. Similarly, it is acceptable that the information processing terminal is equivalent to either a first information processing terminal or a second information processing terminal or both of them.

The navigation server 1 is provided with a support database 10, a first support calculating element 11 and a second support calculating element 12.

The support database 10 is memorized or stored with support map information representing the arrangement of roads or the like. The arrangement of roads or the arrangement of links constituting the road is denoted by a group of dots, the positions of which are defined by (longitude, latitude) or (longitude, latitude, altitude). The term of link refers to a road element joining two arbitrary points in a road such as an intersection point, a right-turn point, a left-turn point or the like. Each ascend slope and each descend slope and the inclination angle of each slope of a link in the advancing direction of the vehicle Q are expressed by the support map information. In addition to mileage information collected from the vehicle Q and mileage factor information, the support database 10 is also stored with weather information transmitted from a weather information center and a mileage matrix. It should be noted that the support database 10 may be configured as a database server separated from the navigation server 1.

The first support calculating element 11 and the second support calculating element 12 are both programmed or configured to function in a mode to be described hereafter. The first support calculating element 11 and the second support calculating element 12 may be composed of one or a plurality of modules separately or one common module. A part or the entire part of a module constituting the first support calculating element 11 may be the same as a part or the entire part of a module constituting the second support calculating element 12.

(Functions of the Navigation Server of a First Embodiment of the Present Invention)

Hereinafter, the functions of the navigation server of a first embodiment of the present invention will be described.

Figure 2:
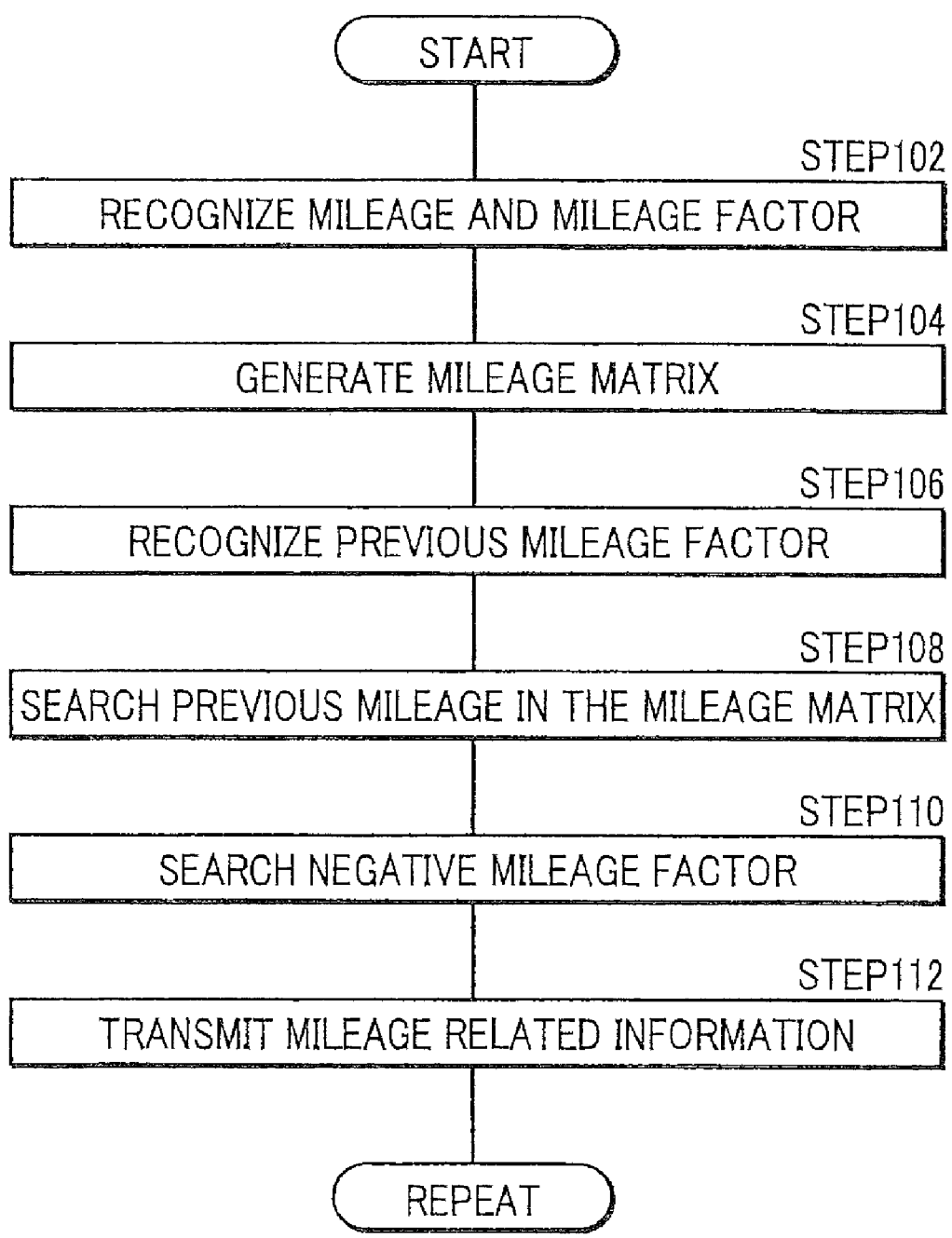
FIG. 2 is a flow chart illustrating a calculating processing procedure by the navigation server according to a first embodiment of the present invention.

The mileage and the mileage factors of the vehicle (first vehicle) Q are recognized by the first support calculating element 11 according to communication with the first information processing terminal composed of ECU 2 and the like mounted in the vehicle Q (FIG. 2/STEP 102).

The mileage factors include a part of or the entire part of the vehicular type, the velocity, the acceleration, the vehicle weight, the air pressure of tire, the degree of deterioration of engine oil, the degree of abrasion of tire, the weather information, the travel time slot and the travel link.

The vehicular type is retrieved as a code by the ECU 2 from a memory included in the ECU 2.

The velocity is determined by the ECU 2 on the basis of output signals from a velocity sensor (not shown). After the position of the vehicle Q is determined on the basis of GPS signals or output signals from a gyro sensor, the range of velocity can be determined on the basis of a temporal variation behavior of the position thereof.

The acceleration is determined by the ECU 2 on the basis of output signals from an acceleration sensor mounted in the vehicle Q. It is acceptable to determine the range of acceleration on the basis of a temporal variation behavior of the position or velocity of the vehicle Q.

The vehicle weight is calculated by the ECU 2 according to output signals from a displacement sensor of each suspension or a part of or the entire part of the number of on-board passengers, the amount of load and the amount of filed gas input by the user into a vehicular navigation apparatus or the like.

The air pressure of tire, the degree of deterioration of engine oil or the degree of abrasion of tire can be calculated by the ECU 2 on the basis of the total travel distance of the vehicle Q after the air pressure of tire has been adjusted or inspected, after the engine oil has been inspected or exchanged, or after the tire has been exchanged.

The weather information is determined by searching the weather information of an area where the present position of the vehicle Q determined by the ECU 2 is from the weather information (weather, temperature, humidity and the like) of each area supplied from the weather information center to be stored in the support database 10. It is also acceptable to determine the ambient temperature of the vehicle Q as the weather information by using the ECU 2 according to output signals from an outer temperature sensor mounted in the vehicle Q.

The travel time slot is obtained according to a clock mounted in the navigation server 1 or the vehicle Q.

The travel link is determined on the basis of the present position of the vehicle Q measured by the ECU and the support map information stored in the support database.

In addition, the operation condition or the like of an air conditioner mounted in the vehicle Q can be detected as a mileage factor. It is also acceptable to recognize the operation condition of the air conditioner, such as the air conditioner will work at higher load as the temperature difference between the outer temperature and the (predefined) comfortable temperature becomes greater, on the basis of the other mileage factors such as the weather information and the like.

Thereby, when the vehicle Q of the vehicular type $x_1$ travelled in a travel link $z_1$ at a velocity $v_1$ and an acceleration $\alpha_1$ in a time slot $T_1$ (11:00-1130, Friday) under weather information $WN_1$ such as clear weather, temperature of $\Delta°$ C. and humidity of ▲%, the mileage was ●● km/l and the like can be understood from the mileage and the mileage factors.

Subsequently, the mileage matrix is generated on the basis of the mileage and the mileage factors which have been recognized by the first support calculating element 11 (FIG. 2/STEP 104).

For a simple description, it is assumed that there are only 2 kinds of the mileage factors. As illustrated in FIG. 3, a first mileage factor which is divided into the number of "n" and a second mileage factor which is divided into the number of "m" form a matrix of n×m, in other words the mileage matrix, for defining each element Fij denoting the mileage.

When the first mileage factor of the ith classification and the second mileage factor of the jth classification and the mileage corresponded thereto have been recognized according to communication with the vehicle (first vehicle) Q, the mileage or the average mileage over time is defined as the (i, j)th element (first element) $F_{ij}$ of the mileage matrix.

On the other hand, if the mileage corresponded to the first mileage factor of the ith classification and the second mileage factor of the (j+1)th classification is not yet recognized, the (i, j+k)th element (second element) $F_{i, j+k}$ is defined by multiplying the (i, j)th element (first element) $F_{ij}$ by a complementary coefficient $C_2(j, j+k)$ stored in a memory of the navigation server 1. If the mileage corresponded to the first mileage factor of the (i+z)th classification and the second mileage factor of the jth classification is not yet recognized, the (i+z, j)th element (second element) $F_{i+z,j}$ is defined by multiplying the (i, j)th element (first element) $F_{ij}$ by a complementary coefficient $C_2(i, i+z)$ stored in a memory of the navigation server 1. The concept of such mileage matrix can be extended when the mileage factors are equal to or more than three (matrix of three dimensions or more).

It is also acceptable to calculate the second element $F_{i, j+k}$ according to a function Cal (j, j+k) stored in a memory of the navigation server 1 with the first element $F_{ij}$ as a variant instead of multiplying it simply by the complementary coefficient.

The complementary coefficient is defined in such a way: the higher the degree of similarity between the mileage factors is, the greater the degree of approximation of the mileage will be.

For example, even though the vehicular types serving as the mileage factors are different, the higher the degree of similarity between the engine output, the way that the wheels are driven or the vehicle size and the like is, the complementary coefficient between the different mileage factors is defined to approximate to "1".

Moreover, even though the links serving as the mileage factors are different, the higher the degree of similarity between the road inclination conditions (inclination angle or the like of ascend slope, descend slope and flat road, respectively), road type (highway, city roads and the like) or road shape (linear road, slightly curved road and meandering road or the like) is, the complementary coefficient between the different mileage factors is defined to approximate to "1".

Furthermore, even though the ranges of velocity or acceleration serving as the mileage factors are different, the closer the ranges are, the complementary coefficient between the different mileage factors is defined to approximate to "1".

Therefore, when the degree of similarity between the recognized mileage factor and the unrecognized mileage factor is high, the value approximate to the first element (mileage) which is defined by the recognized mileage factor is determined as the second element (mileage) which is defined by the unrecognized mileage factor.

The mileage factor of the vehicle (second vehicle) Q in the previous time is recognized by the second support calculating element 12 according to communication with the second information processing terminal composed of ECU 2 and the like mounted in the vehicle Q (FIG. 2/STEP 106).

Specifically, the data denoting the positions of the vehicle Q determined on the basis of GPS signals or the like at plural times is transmitted by the ECU 2 from the vehicle Q to the navigation server 1. Thereby, as the example illustrated in FIG. 4, the actual travel route R of the vehicle Q and the links constituting the travel route R are recognized as one of the mileage factors by the second support calculating element 12.

The accumulated determination results of the velocity and the acceleration of the vehicle Q in the previous times are used as the mileage factors. Moreover, among the weather information stored in the support database 10, the previous weather information of an area where the link is present is recognized as the mileage factor. Furthermore, the vehicular type of the vehicle Q serving as the second vehicle which is retrieved from the memory and thereafter transmitted to the navigation server 1 is recognized by the ECU 2 as the mileage factor.

Thereby, for example, when the vehicle Q of the vehicular type $x_2$ travelled in a travel link $z_2$ at a velocity $v_2$ and an acceleration $\alpha_2$ in a time slot $T_2$ under weather information $WN_2$ such as raining weather, temperature of ○° C. and humidity of ●%, such mileage factors in the previous time are recognized. The mileage factors of the second vehicle in the previous time may be included in the generation basis for the mileage matrix as the mileage factors of the first vehicle, or may be excluded therefrom.

The elements defined by the mileage factors are searched from the mileage matrix by the second support calculating element 12 (FIG. 2/STEP 108).

For example, suppose that the mileage matrix illustrated in FIG. 3 is generated, when the first mileage factor of the ith classification and the second mileage factor of the jth classification are recognized as the mileage factors of the second vehicle in the previous time, the (i, j)th element $F_{ij}$ of the mileage matrix is determined as the previous mileage of the second vehicle.

The mileage factors which are used to define the elements of the mileage matrix and have the previous mileage less than a predefined value are searched as negative mileage factors by the second support calculating element 12 from the support database 10 (FIG. 2/STEP 110).

Thereby, for example, when the vehicle Q of the vehicular type $x_2$ travelled in the travel link $z_2$ at the velocity $v_2$ and the acceleration $\alpha_2$ in the time slot $T_2$ under weather information $WN_2$ such as raining weather, temperature of $O°$ C. and humidity of ●%, such mileage factors are searched as the negative mileage factors. Moreover, as illustrated in FIG. 4, partial links (bold line) L1 to L3 of the travel route R of the vehicle Q serving as the second vehicle and the other mileage factors such as the acceleration or the like in combination with the links are searched as the negative mileage factors.

Thereafter, mileage related information based on the negative mileage factors is transmitted to the second information processing terminal by the second support calculating element 12 (FIG. 2/STEP 112). Thereby, the information based on the negative mileage factors is displayed as the mileage related information on a display device or a display member of a computer mounted in the vehicle Q.

Figure 4:
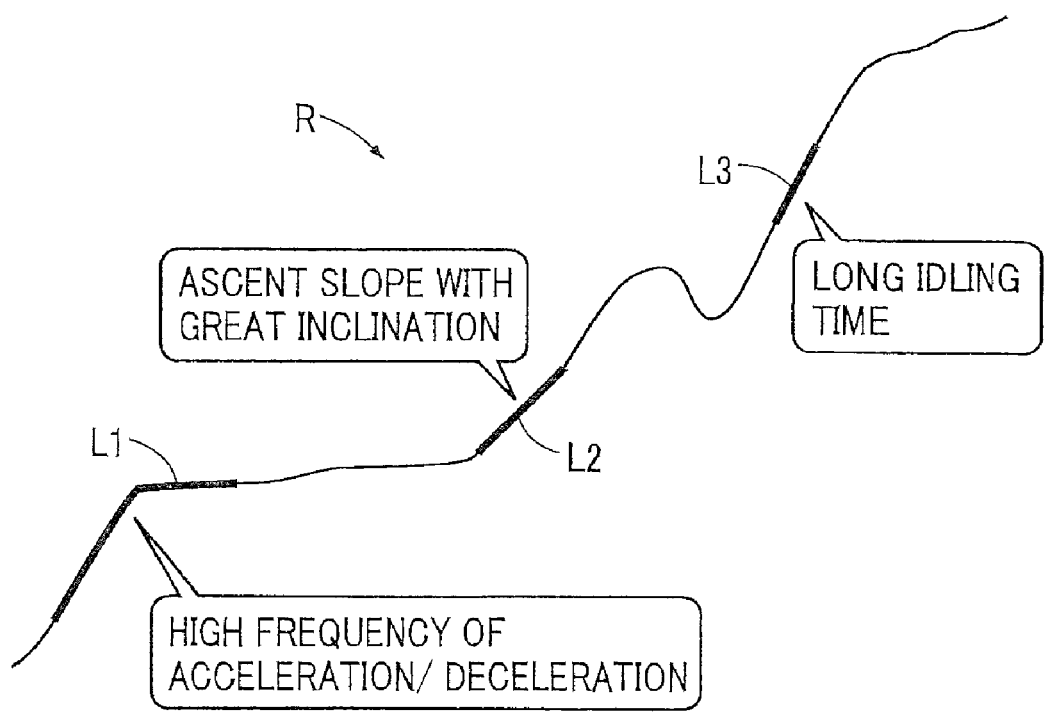
FIG. 4 is an explanatory diagram related to mileage related information.

For example, as illustrated in FIG. 4, the links L1 to L3 are highlighted by color or the like to be distinguished from the other links, and the messages based on the negative mileage factors such as "High frequency of acceleration/deceleration (determined according to acceleration (mileage factor))", "Ascent slope with great inclination (determined according to inclination posture (mileage factor) of the vehicle Q measured by the gyro sensor)" or "Long idling time" are displayed.

It is also acceptable to transmit advice information for improving the mileage in consideration of the negative factors to the vehicle Q as the mileage related information. For example, the advice information such as "the mileage would be better if the acceleration is performed slowly", "the mileage would be better if the road with more ascend slops is avoided", or "the mileage would be better if the idling time is shortened" is transmitted to the vehicle Q and displayed on the display device thereof.

Moreover, it is also acceptable that the mileage factors which are used to define the elements of the mileage matrix and have the previous mileage no less than the predefined value are searched as positive mileage factors in addition to or in place of the negative factors, the information based on the positive mileage factors is transmitted to the second information processing terminal as the mileage related information and displayed on the display device thereof.

According to the navigation server with the aforementioned functions in the first embodiment of the present invention, in the mileage matrix containing elements which denote a mileage and are defined by plural mileage factors, the first element defined by the recognized mileage factor of the first vehicle is determined according to the recognized mileage of the first vehicle (refer to FIG. 2/STEP 104 and FIG. 3). According thereto, when the mileage factor of the second vehicle in the previous time is used to define the first element, the previous mileage of the second vehicle can be evaluated with high accuracy on the basis of the known relationship between the mileage and the mileage factor of the first vehicle.

On the other hand, among the elements in the mileage matrix, the second element defined by the unrecognized mileage factor is determined on the basis of the first element (refer to FIG. 2/STEP 104 and FIG. 3). Thereby, even when the plural mileage factors of the second vehicle are used to define the second element but not the first element, the previous mileage of the second vehicle can be evaluated with high accuracy in consideration of the relationship between the mileage and the mileage factor of the first vehicle estimated according to the known relationship therebetween.

Accordingly, even though the mileage factors of the second vehicle, namely the mileage of the first vehicle related to the links or the like constituting the travel route is not recognized, the mileage related information denoting the main affecting factors on the previous mileage of the second vehicle, and further the advice information for improving the mileage can be provided to the user of the second vehicle if necessary (refer to FIG. 2/STEP 110 and STEP 112, FIG. 4).

It is also acceptable that the mileage matrix (hereinafter, referred to as a first mileage matrix) in which each element is defined by the mileage factor containing a vehicular identifier, such as VIN and the like, for identifying individual vehicle Q in place of the vehicular type, and the mileage of the vehicle Q in the previous time is searched on the basis of the first mileage matrix (refer to FIG. 2/STEP 102 to STEP 108).

Therefore, when the vehicle Q has travelled the same link under the same travel conditions for plural times, the previous mileage can be searched on the basis of the mileage of the same vehicle Q identified by the vehicular identifier which is one of the mileage factors when the vehicle Q travelled the link for one time in the further previous time or for plural times in the further previous time. The statistic value such as the average of the mileage corresponding to the same mileage factor when the vehicle Q has travelled the link for plural times is determined as the element of the first mileage matrix defined by the mileage factor. The complementary coefficient of the first mileage matrix may be defined different from the complementary coefficient of the mileage matrix (hereinafter, referred to as a second mileage matrix) defined by the mileage factors containing the vehicular identifier instead of the vehicular type.

It is acceptable that the first mileage matrix in which the elements defined by the unrecognized mileage factors are not complemented is generated, and the previous mileage of the vehicle Q is firstly searched in the perforated first mileage matrix and thereafter searched in the second mileage matrix if the former search is failed.

Thus, when the vehicle Q travels under the same travel conditions for plural times, the previous mileage of the vehicle Q can be searched according to the previous mileage of the self vehicle with the same vehicular identifier in further previous time. On the other hand, when it is predicted that the vehicle Q is travelling under travel conditions different from the previous travel conditions, the previous mileage of the vehicle Q can be searched on the basis of the previous mileage of the other vehicle with the same vehicular type as the vehicle Q but not the previous mileage of the self vehicle.

(Functions of the Navigation Server of a Second Embodiment of the Present Invention)

Hereinafter, the functions of the navigation server of a second embodiment of the present invention will be described.

Figure 5:
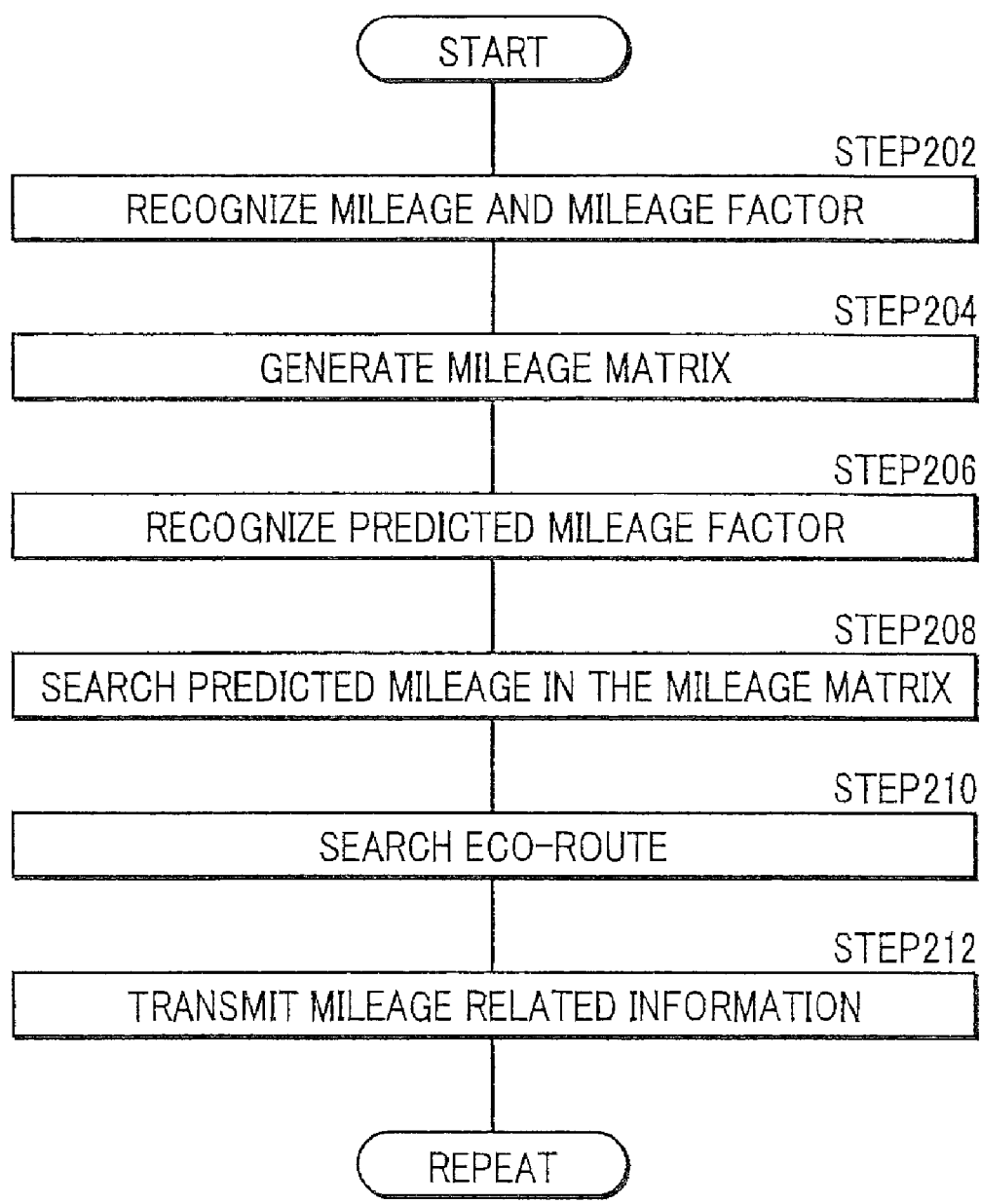
FIG. 5 is a flow chart illustrating a calculating processing procedure by the navigation server according to a second embodiment of the present invention.

Similar to the first embodiment, the mileage and the mileage factors of the vehicle (first vehicle) Q are recognized by the first support calculating element 11 according to communication with the first information processing terminal composed of ECU 2 and the like mounted in the vehicle Q (FIG. 5/STEP 202).

Subsequently, similar to the first embodiment, the mileage matrix is generated on the basis of the mileage and the mileage factors which have been recognized by the first support calculating element 11 (FIG. 5/STEP 204).

The mileage factors of the vehicle (second vehicle) Q in the future time are recognized by the second support calculating element 12 according to communication with the second information processing terminal composed of ECU 2 and the like mounted in the vehicle Q (FIG. 5/STEP 106).

Specifically, the data denoting the present position (or departure position) $P_1$ of the vehicle Q which has been determined on the basis of GPS signals or the like and the destination position $P_2$ which has been input to the ECU 2 by the user are transmitted by the ECU 2 from the vehicle Q to the navigation server 1. Accordingly, plural support routes R joining the present position $P_1$ and the destination position $P_2$ are searched by the second support calculating element 12 on the basis of the support map information. Thereby, as the example illustrated in FIG. 4, the support routes $R_1$ to $R_3$ joining the present position $P_1$ and the destination position $P_2$ of the vehicle Q are searched.

The links constituting each support route R are recognized as one of the mileage factors. The traffic information provided from the traffic information center, or the travel velocity (and the acceleration if necessary) of the vehicle Q in the links predicted on the basis of the traffic information generated according to FCD is recognized as the mileage factor.

Among the weather information stored in the support database 10, the predicted future weather information of an area containing the links is recognized as the mileage factor.

The vehicular type of the vehicle Q serving as the second vehicle is retrieved from memory and transmitted to the navigation server 1 by the ECU 2, and is recognized as the mileage factor.

On the basis of the road traffic information, the predicted travel time $t_1$ ($T_1$) in the first time slot $T_1$ (for example, from 6:30 to 7:00) corresponded to the departure time slot for the first link $L_1$ containing the present position (or the departure position) $P_1$ of the vehicle Q is determined. The predicted travel time $t_2$ ($T_2$) in the second time slot $T_2$ containing the time ($t_0+t_1$) which is obtained by adding the predicted travel time $t_1$ determined according to the road traffic information for the first link $L_1$ to the time $t_0$ contained in the first time slot $T_1$ is determined for the second link $L_2$.

Similarly, the predicted travel time $t_i$ ($T_i$) in the ith time slot $T_i$ containing the time $\Sigma_{k=0 \sim i-1} t_k$ which is obtained by adding the predicted travel time $t_{i-1}$ for the (i−1)th link $L_{i-1}$ to the time $\Sigma_{k=0 \sim i-2} t_k$ contained in the (i−1)th time slot $T_{i-1}$ is determined for the ith link $L_i$ (i=3, 4, . . . , n). Thereby, for example, when the vehicle Q of the vehicular type $x_2$ travelled in the travel link $z_2$ at a velocity range $Rv_2$ and an acceleration range $Ra_z$ in the time slot $T_2$ under weather information $WN_2$ such as raining weather, temperature of ○° C. and humidity of ●%, such mileage factors in the future time are predicted.

The elements defined by the mileage factors are searched from the mileage matrix by the second support calculating element 12 (FIG. 5/STEP 208). For example, suppose that the mileage matrix illustrated in FIG. 3 is generated, when the first mileage factor of the ith classification and the second mileage factor of the jth classification are recognized as the mileage factor of the second vehicle, the (i, j)th element of the mileage matrix is determined as the predicted mileage of the second vehicle. Thereby, the predicted mileage for each link constituting the support route is determined on the basis of the weather information or the like serving as another mileage factor.

Among the plural support routes R, the route with the best predicted mileage is searched by the second support calculating element 12 as the eco-route ER (FIG. 5/STEP 210).

As aforementioned, since the predicted mileage for each link constituting the support route R has been determined, a support route R with the least sum of the predicted mileage is selected as the eco-route ER. For example, among the 3 support routes R1 to R3 illustrated in FIG. 6, the support route R3 is searched as the eco-route ER.

Thereafter, the information denoting the eco-route ER is transmitted to the second information processing terminal by the second support calculating element 12 as the mileage related information (FIG. 5/STEP 212). Thereby, the eco-route ER is displayed as the mileage related information on a display device or a display member of a computer mounted in the vehicle (second vehicle) Q.

In place of or in addition to the eco-route ER, a sum or the like of the predicted mileage when the vehicle Q has traveled to the destination position $P_2$ along one or plural support routes R may be transmitted from the navigation server 1 to the ECU of the vehicle Q serving as the second vehicle as the mileage related information.

According to the navigation server with the aforementioned functions in the second embodiment of the present invention, in the mileage matrix containing elements which denote a mileage and are defined by plural mileage factors, the first element defined by the recognized mileage factors of the first vehicle is determined according to the recognized mileage of the first vehicle (refer to FIG. 5/STEP 204 and FIG. 3). According thereto, when the mileage factors of the second vehicle in the future time are used to define the first element, the future mileage of the second vehicle can be evaluated with high accuracy on the basis of the known relationship between the mileage and the mileage factors of the first vehicle.

On the other hand, among the elements in the mileage matrix, the second element defined by the unrecognized mileage factors is determined on the basis of the first element (refer to FIG. 5/STEP 204 and FIG. 3). Thereby, even when the mileage factors of the second vehicle in the future time are used to define the second element but not the first element, the future mileage of the second vehicle can be evaluated with high accuracy in consideration of the relationship between the mileage and the mileage factors of the first vehicle estimated according to the known relationship therebetween.

Figure 6:
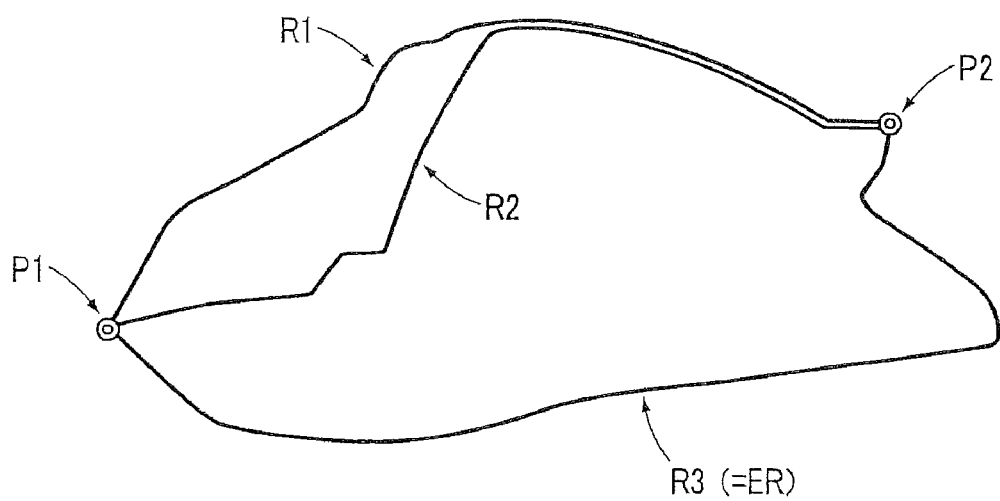
FIG. 6 is an explanatory diagram related to an eco-route serving as the mileage related information.

Accordingly, even though the mileage factors of the second vehicle, namely the mileage of the second vehicle related to the links constituting the route which joins the present position $P_1$ and the destination position $P_2$ is not recognized, the mileage related information related to the eco-route ER with the best predicted mileage for the second vehicle can be provided to the user of the second vehicle (refer to FIG. 5/STEP 210 and STEP 212, FIG. 6).

It is also acceptable that the mileage matrix (hereinafter, referred to as a first mileage matrix) in which each element is defined by the mileage factor containing a vehicular identifier, such as VIN or the like, for identifying individual vehicle Q in place of the vehicular type, and the mileage of the vehicle Q in the future time is predicted on the basis of the first mileage matrix (refer to FIG. 5/STEP 202 to STEP 208).

Therefore, when the vehicle Q is predicted to travel the same link which has been travelled before under the same travel conditions, the future mileage can be predicted on the basis of the mileage of the same vehicle Q identified by the vehicular identifier which is one of the mileage factors when the same vehicle Q has travelled the link for one time or for plural times in the previous time. The statistic value such as the average of the mileage corresponding to the same mileage factor when the vehicle Q has travelled the link for plural times is determined as the element of the first mileage matrix defined by the mileage factor. The complementary coefficient of the first mileage matrix may be defined different from the complementary coefficient of the mileage matrix (hereinafter, referred to as a second mileage matrix) defined by the mileage factors containing the vehicular type instead of the vehicular identifier.

It is acceptable that the first mileage matrix in which the elements defined by the unrecognized mileage factors are not complemented is generated, the future mileage of the vehicle Q is firstly predicted on the basis of the perforated first mileage matrix, and thereafter the future mileage of the vehicle Q is predicted on the basis of the second mileage matrix if the former prediction is failed.

Thus, when the vehicle Q is predicted to travel under the same travel conditions as before, the future mileage of the vehicle Q can be predicted according to the previous mileage of the self vehicle with the same vehicular identifier in the previous time. On the other hand, when it is predicted that the vehicle Q is travelling under travel conditions different from the previous travel conditions, the future mileage of the vehicle Q can be predicted on the basis of the previous mileage of the other vehicle with the same vehicular type as the vehicle Q but not the previous mileage of the self vehicle.

(Functions of the Navigation Server of a Third Embodiment of the Present Invention)

Hereinafter, the functions of the navigation server of a third embodiment of the present invention will be described.

Figure 7:
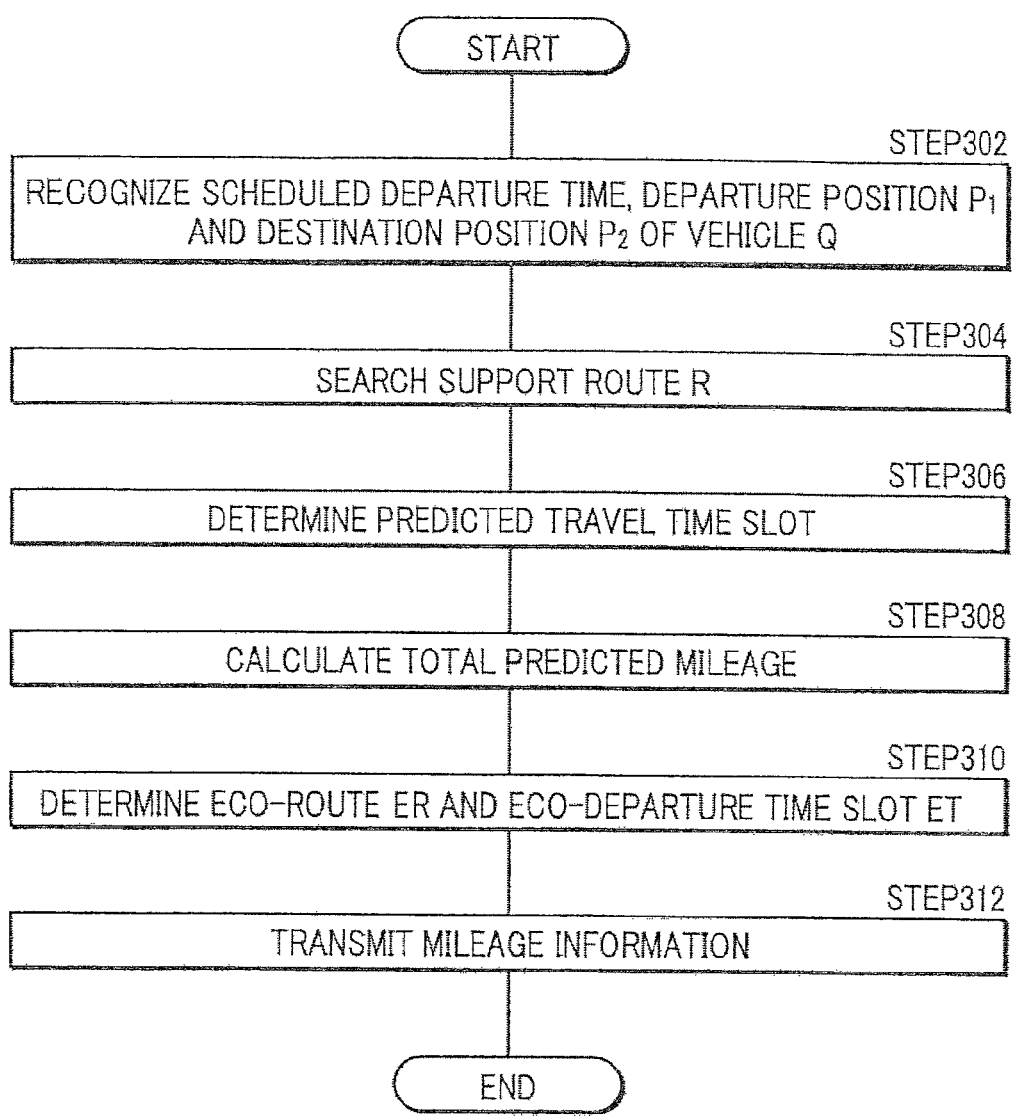
FIG. 7 is a flow chart illustrating a calculating processing procedure by the navigation server according to a third embodiment of the present invention.

Firstly, the scheduled departure time, the departure position $P_1$ and the destination position $P_2$ of the vehicle Q are recognized by the first support calculating element 11 according to communication with the vehicle Q (FIG. 7/STEP 302). The scheduled departure time, the departure position (or scheduled departure position) $P_1$ and the destination position $P_2$ are set by the user for the vehicle Q and are transmitted from the vehicle Q to the navigation server 1.

It is acceptable that the present position of the vehicle Q is determined as the departure position $P_1$ of the vehicle Q on the basis of GPS signals received by a GPS receiver mounted in the vehicle Q and transmitted from the vehicle Q to the navigation server 1.

Figure 8:
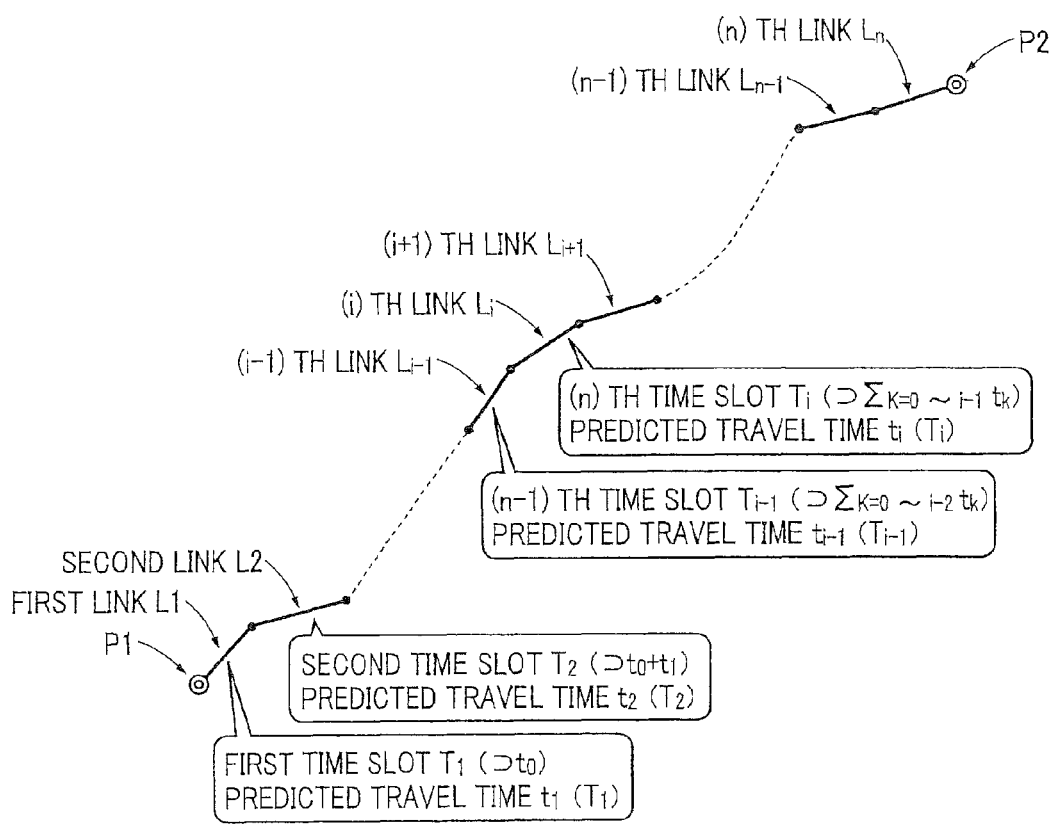
FIG. 8 is an explanatory diagram related to a calculation method of a predicted mileage.

Then, one or plural support routes R joining the departure position $P_1$ and the destination position $P_2$ of the vehicle Q is searched by the first support calculating element 11 on the basis of the support map information (FIG. 7/STEP 304). For example, as illustrated in FIG. 8, the support route R constituted by plural links sequentially connected from the departure position $P_1$ to the destination position $P_2$ of the vehicle Q is searched.

It is acceptable that the navigation route joining the departure position $P_1$ and the destination position $P_2$ of the vehicle Q is searched by the vehicle Q or the like or set by the user and the obtained navigation route is transmitted from the vehicle Q to the navigation server 1 to be recognized by the first support calculating element 11 in place of or in addition to searching the support route R.

Thereafter, the predicted travel time slot of the vehicle Q for each link constituting the support route R is recognized by the first support calculating element 11 (FIG. 7/STEP 306).

Specifically, plural departure time slots of the vehicle Q are set at first. For example, when the scheduled departure time of the vehicle Q is "7:40", a reference departure time slot containing the scheduled departure time slot "7:30-8:00", previous time slots within an hour earlier than the reference departure time slot "6:30-7:00" and "7:00-7:30", and posterior time slots within an hour later than the reference departure time slot "8:00-8:30" and "8:30-9:00" are set as the plural departure time slots.

The previous time slots only or the posterior time slots only may be set as the departure time slots in place of the previous time slots and the posterior time slots of the reference departure time slot. The length of each time slot may be set arbitrarily to be identical or different. The plural time slots may be set by the user and transmitted from the vehicle Q or the like to the navigation server 1 to be recognized by the first support calculating element 11.

Subsequently, on the basis of the road traffic information, the predicted travel time $t_1$ ($T_1$) in the first time slot $T_1$ (for example, "6:30-7:00") of the plural departure time slots is determined for the first link $L_1$ illustrated in FIG. 8.

The predicted travel time $t_2$ ($T_2$) in the second time slot $T_2$ containing the time $t_0+t_1$ which is obtained by adding the predicted travel time $t_1$ for the first link $L_1$ to the time $t_0$ contained in the first time slot $T_1$ is determined for the second link $L_2$.

Similarly, the predicted travel time $t_i$ ($T_i$) in the ith time slot $T_i$ containing the time $\Sigma_{k=0 \sim i-1} k_k$ which is obtained by adding the predicted travel time $t_{i-1}$ for the (i−1)th link $L_{i-1}$ to the time $\Sigma_{k=0 \sim i-2} t_k$ contained in the (i−1)th time slot $T_{i-1}$ is determined for the ith link $L_i$ (i=3, 4, . . . , n).

The road traffic information contains road traffic information which is generated on the basis of the travel time of the vehicle for each link collected by the server of the road traffic information management center such as a VICS center and the like and is transmitted or provided to the navigation server 1, and road traffic information which is generated on the basis of the FCD (floating car data) collected by the navigation server 1 from the vehicle Q serving as the floating car.

The total predicted mileage for each combination of the support route R and the departure time slots is calculated by the second support calculating element 12 (FIG. 7/STEP 308).

Specifically, the elements of the mileage matrix defined by the plural mileage factors containing the ith link $L_i$ constituting the support route R and the predicted travel time $t_1$ of the vehicle Q are determined as the predicted mileage for travelling the ith link $L_i$ (refer to FIG. 3).

By adding up the predicted mileage for all the links constituting the support route R, the total predicted mileage for the combination of the support route R and the departure time slots is calculated. Thereby, for example, when the vehicle Q of the vehicular type x travelled in the travel link z at a velocity range Rv and an acceleration range Rα in the time slot T under weather information WN such as raining weather, temperature of O° C. and humidity of ●%, the element defined by such mileage factors in the future time is determined as the predicted mileage.

Similar to the first and second embodiments, it is acceptable that the first support calculating element 11 recognizes the mileage of the vehicle Q and the plural mileage factors according to communication with the vehicle Q or the like, among the elements in the mileage matrix, the first element defined by the recognized mileage factors is determined according to the mileage and the second element defined by the unrecognized mileage factors is determined according to the first element to as to generate the mileage matrix.

Thereafter, the combination of the support route R with the best total predicted mileage and the departure time slot T is determined as the eco-route ER and the eco-departure time slot ET by the second support calculating element 12 (FIG. 7/STEP 310).

The mileage information denoting the eco-route ER and the eco-departure time slot ET is transmitted to the vehicle Q or the like by the second support calculating element 12 (FIG. 7/STEP 312).

Figure 9:
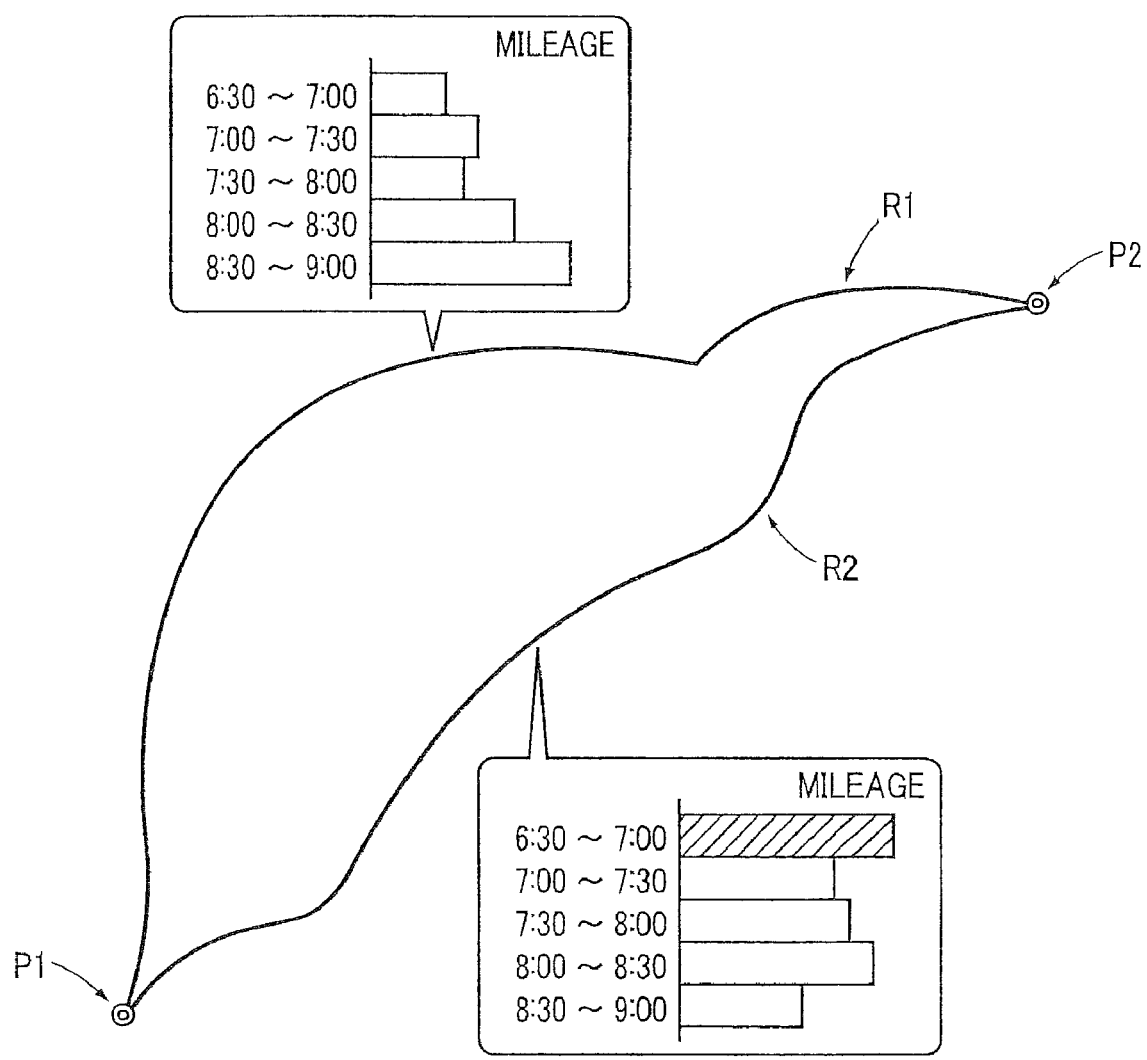
FIG. 9 is an explanatory diagram related to mileage information.

Thus, as illustrated in FIG. 9, for each of the 2 support routes $R_1$ and $R_2$ and each of the 5 departure time slots "6:30-7:00", "7:00-7:30", "7:30-8:00", "8:00-8:30" and "8:30-9:00", the mileage denoted by the bar graphs is displayed on the display device of the vehicle Q or the like. The mileage in the graph corresponded to the eco-route ER and the eco-departure time slot ET is colored with a different color from the other mileage in the graph.

According to the navigation server with the aforementioned functions in the third embodiment of the present invention, the mileage for the vehicle Q to travel from the departure position $P_1$ to the destination position $P_2$ along the support route R can be appropriately predicted on the basis of the mileage matrix for each of the plural departure time slots in consideration of the fact that the mileage varies according to the travel link of the vehicle Q and the time slot for the vehicle Q to travel the travel link (refer to FIG. 7/STEP 308, FIG. 3 and FIG. 8).

The mileage information related to the total predicted mileage for each of the plural departure time slots is transmitted to the vehicle Q or the like. Thereby, the appropriate route and departure time slot from the viewpoint of improving the mileage for the vehicle Q to travel from the departure position $P_1$ to the destination position $P_2$ can be recognized by the user.

Specifically, the best eco-route ER and eco-departure time slot ET from the viewpoint of improving the mileage for the vehicle Q to travel from the departure position $P_1$ to the destination position $P_2$ can be recognized by the user. For example, as illustrated in FIG. 5, the optimum travel from the departure position $P_1$ at 6:40 which is 1 hour earlier than the scheduled departure time 7:40 to the destination position $P_2$ along the support route $R_2$ from the viewpoint of improving the mileage can be recognized by the user of the vehicle Q.

What is claimed is:

1. A navigation server which manages mileage information of a vehicle, comprising:
    a first support element configured to recognize a mileage and a plurality of mileage factors serving as mileage variation factors of a first vehicle according to communication with a first information processing terminal, and to generate a mileage matrix containing elements which denote the mileage and are defined by the mileage factors by determining a first element of the elements in the mileage matrix which is defined by a recognized mileage factor on the basis of the mileage and a second element of the elements in the mileage matrix which is defined by an unrecognized mileage factor on the basis of the first element, and
    a second support element configured to recognize a mileage factor of a second vehicle in a future time according to communication with a second information processing terminal, to search an element defined by the recognized mileage factor as a predicted mileage on the basis of the mileage matrix generated by the first support element, and to transmit mileage related information determined on the basis of the predicted mileage to the second information processing terminal.

2. The navigation server according to claim 1, wherein the second support element is configured to recognize a link constituting each of a plurality of routes joining a present position or a departure position of the second vehicle and a destination position thereof according to communication with the second information processing terminal as the mileage factor, to search a route with the best mileage from the plurality of routes as an eco-route, and to transmit the mileage related information denoting the eco-route to the second information processing terminal.

* * * * *